Jan. 24, 1956     W. O. McCLUNE     2,732,044
PREFABRICATED CONSTANT PRESSURE JOINT CONSTRUCTION
Filed April 16, 1954                         2 Sheets—Sheet 1
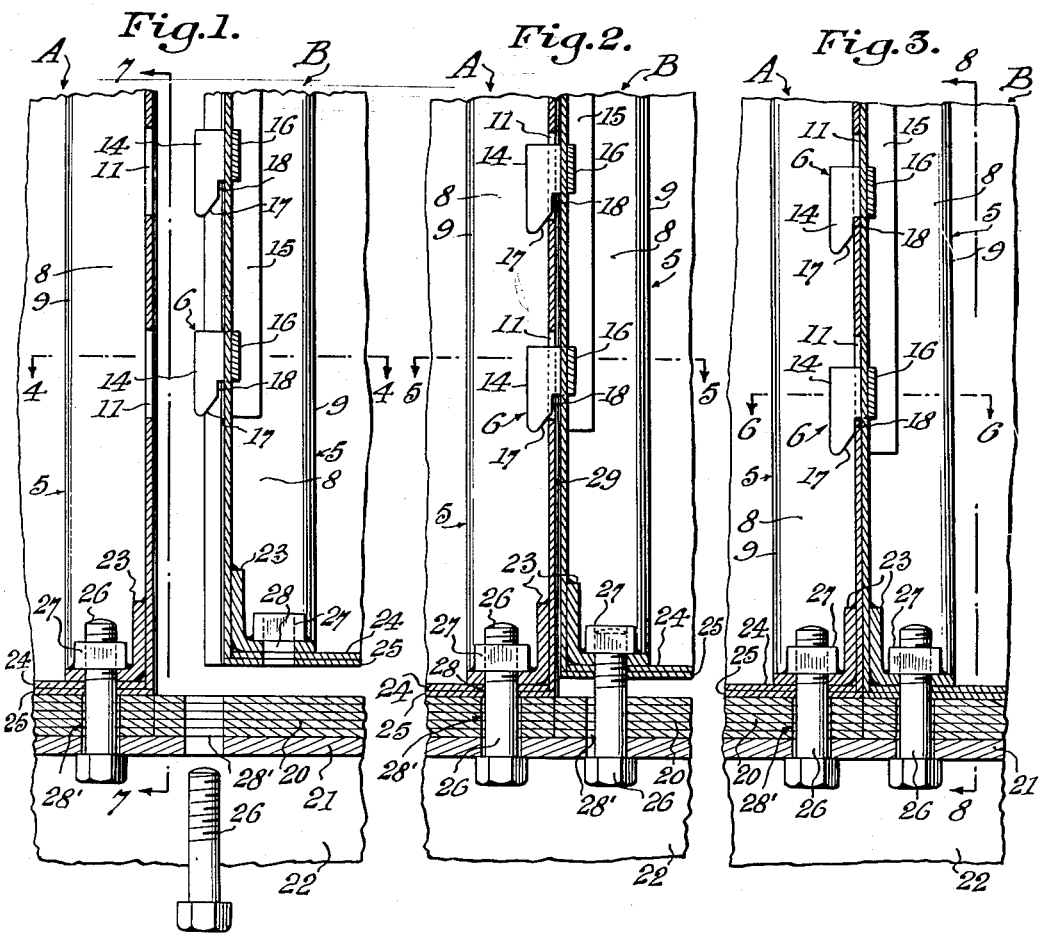
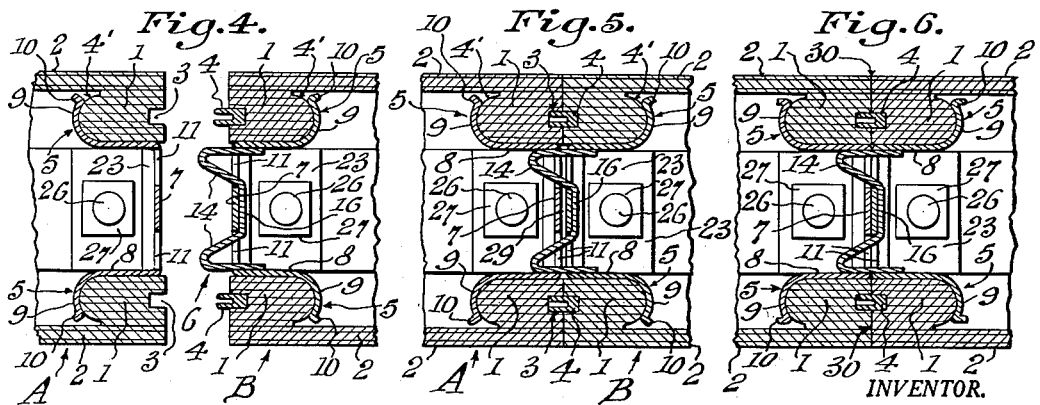
INVENTOR.
Wallace O. McClune
BY
ATTORNEYS

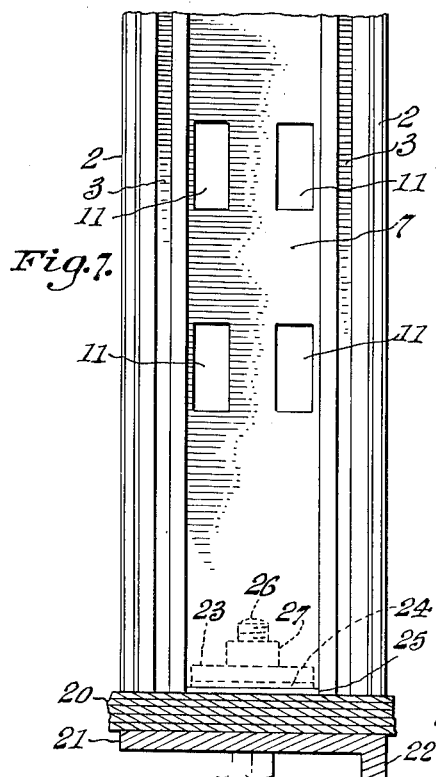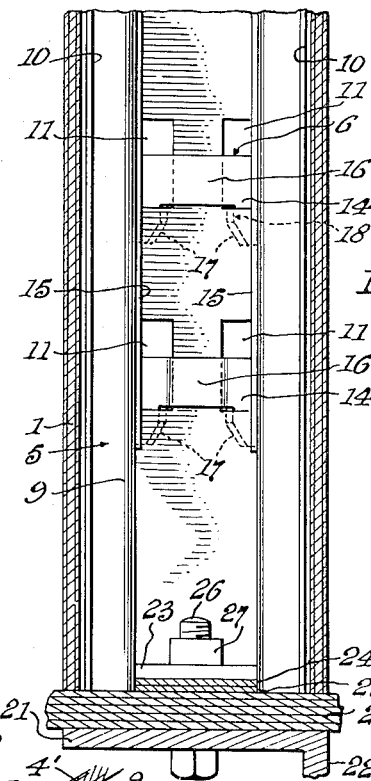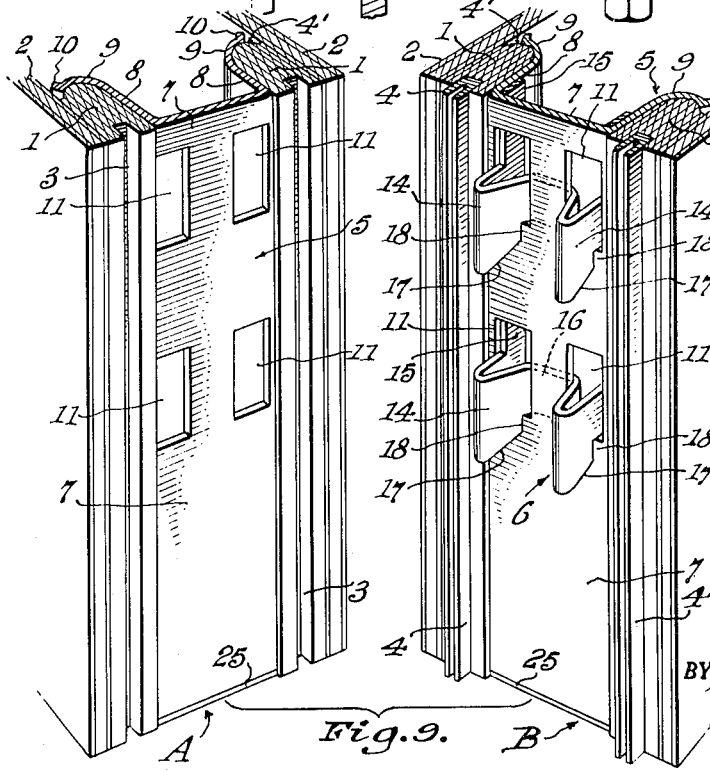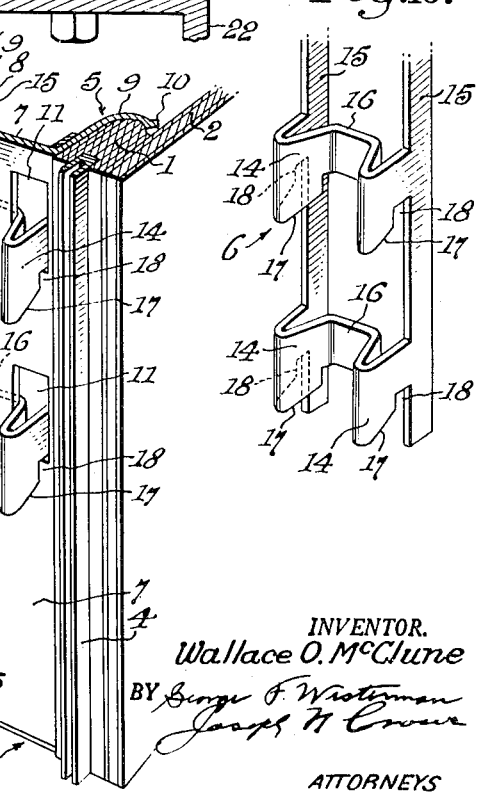

2,732,044
Patented Jan. 24, 1956

2,732,044

PREFABRICATED CONSTANT PRESSURE JOINT CONSTRUCTION

Wallace O. McClune, New York, N. Y.

Application April 16, 1954, Serial No. 423,867

5 Claims. (Cl. 189—36)

(Granted under Title 35, U. S. Code (1952), sec. 266)

The invention described herein may be manufactured and used by or for the Government for governmental purposes, without payment to me of any royalty thereon.

This invention relates to building structures and more particularly to a prefabricated constant pressure joint construction for use in connection with panel sections joined in edge to edge relation to maintain tight, leakproof joints in the wall, floor, or roof of a structure.

Heretofore, such panel section joints have been treated by the application of glue, mastic, cover strips, or external coatings of various types and locking devices. These expedients are generally not satisfactory in that they cannot expand or contract to the same degree as the material of which the panel sections are made and consequently cannot provide a leakproof joint.

In order to eliminate the difficulties heretofore encountered, it is a principal object of the present invention to provide a constant pressure joint construction for structures using panel sections regardless of changing physical conditions tending to expand or contract the joint.

It is a further object of the instant invention to provide a joint construction for structures using panel sections wherein the pressure required to keep the joint closed is localized and limited to the immediate area of the joint permitting the use of thin, light-weight cladding or sheathing, since the sheathing or cladding is not required to aid in keeping the joint closed effecting a reduction in unit weight of material used.

It is a further object of the present invention to provide a leakproof joint construction for structures using panel sections which does not depend on glue, mastic, cover strips, or external coatings of any type to achieve this result.

It is a further object of the present invention to provide a leakproof joint construction for structures using panel sections which may be readily assembled in the field without the necessity of any adjustment.

It is a further object of the present invention to provide a leakproof joint construction wherein the constant pressure applied will not destroy the fibers along the edge of the material used.

It is a further object of the present invention to provide a leakproof joint construction for structures using prefabricated panel sections wherein normally unstressed flexible clamping members, joining abutting registering panel sections, are drawn together by a wedge-lug structure which stresses the clamping members and maintains a leakproof joint line between the panel sections.

Other objects and advantages will be readily apparent as the description proceeds, and as illustrated in the accompanying drawings, wherein—

Fig. 1 is an elevational view, partly in section, showing two panel sections fitted with one embodiment of the instant invention in position prior to joining with one panel elevated slightly;

Fig. 2 is an elevational view, partly in section, showing the panel sections of Fig. 1 in an intermediate position prior to final closure of the joint;

Fig. 3 is an elevational view, partly in section, showing the panel sections in final position and with the joint between the panels completely closed;

Fig. 4 is a horizontal sectional view taken on the line 4—4 of Fig. 1;

Fig. 5 is a horizontal sectional view taken on the line 5—5 of Fig. 2;

Fig. 6 is a horizontal sectional view taken on the line 6—6 of Fig. 3;

Fig. 7 is a front elevational view of a clamping member showing openings for the reception of the wedge-lug members which effect closure of the joint taken on the line 7—7 of Fig. 1;

Fig. 8 is a rear elevational view of the clamping member illustrated in Fig. 7 with a section of a wedge-lug strip showing the wedge-lugs positioned in the openings taken on the line 8—8 of Fig. 3;

Fig. 9 is a perspective view of the structural elements of the constant pressure joint construction of the instant invention in unassembled condition; and Fig. 10 is a perspective view of a section of wedge-lug strip.

The invention may be best understood by referring to Fig. 9 of the drawings wherein continuous clamp strips 1 are secured in any suitable manner to "claddings" or sheathing panels 2 with the panel edges in register with the clamp strip edges. The panels may be of any suitable building sheet material made of natural or artificial fibers or non-fibrous material. The clamp strips are provided with matching groove and spline construction as shown at 3 and 4, respectively, to facilitate aligning the panels when the sections are joined together. The edges of the clamp strips opposite the plane surfaced edges in which the groove 3 and spline 4 are formed, are of curved contour as at 4' for a purpose to be hereinafter described. The remaining opposing sides of the clamp strips are plane surfaced and parallel.

The joints of the panel sections are maintained under constant pressure by means of the uniform clamping action provided by the resilient metal members shown generally at 5 acting in cooperation with the wedge-lug structure shown generally at 6. The resilient U-shaped metal members 5 which may be formed of any resilient material, preferably metal, are formed with a flat web portion 7 and legs, each of which includes a flange having a flat section 8 and a curved section 9 terminating in a lip 10. These metal members 5 are the same length as the wood clamping strips 1, but the flat section 7 is less in length than the parallel plane-surfaced sides of the clamping strips, and the radius of the curved section is less than the radius of the curved portion of the clamping strips 1, so that the metal members do not quite fit the clamping strips of reasons which will be hereinafter explained A metal member 5 is arranged at each vertical end of a panel section composed of parallel runs of building material as heretofore described. Of course, it is understood that the assembly may also be applied to horizontal edges of panel sections if the need arises to erect structures which exceed one panel section in height. Each metal member 5 is provided with mutually spaced openings or slots 11 arranged in any convenient regular pattern along the web 7. These openings or slots 11 are punched or otherwise formed in the web 7. The metal members 5, located in the ends of the panel sections, are brought into web-to-web registering face relation by the wedge-lug structure shown generally at 6. The wedge-lugs 14 may be formed in a continuous strip as shown in Fig. 10 by a stamping, punching, or other suitable operation. Alternatively, the wedge-lugs may be formed separately and secured as by tack-welding or other suitable process to the strips 15. The wedge-lugs 14 which are arranged in tandem on the strips 15 and spaced at three or four inch intervals thereon, are joined by a bight portion 16 and in horizontal cross-section are wedge-shaped. The vertical leading edge of each lug is rounded, and the lower edge inclines rearwardly as at 17 to facilitate joining the panel sections, and terminates in a notch 18 having vertical sides, one of which is formed by the leading edge of the strip to which the lugs are either fastened or form an integral part thereof.

The length of the inclined lower edge 17 is not critical but the notch is dimensioned to be twice the thickness or gage of the material of the metal members 5. As shown in Fig. 9, the wedge-lugs are inserted in the openings of slots 11 which are spaced and arranged to cooperate with the wedge-lugs, with the inclined edge 17 projecting beyond the outer edge of a panel section to facilitate inserting the wedge-lugs into the openings 11 in the metal member 5 located in the end of an adjoining panel section. After insertion, the wedge-lugs are welded or otherwise secured to the web of the parent metal member 5.

It is to be understood, of course, that the wedge-lug structure may be positioned with the wedge-lugs inserted through the openings 11 and the strips 15 permanently secured to the flat flange section 8 of the metal members 5 by tack-welding or other convenient method at the fabricating point to speed up field erection, reduce the number of separate components which must be handled during erection and prevent slippage of the wedge-lugs in the slots or openings 11 during field erection of the panel sections. Alternatively, the wedge-lugs could also be formed by being punched out of the web thereby forming an integral part of the web structure. With the latter construction, each panel section would be provided at one vertical end with a metal-member having wedge-lugs so formed thereon. An additional feature of the novel wedge-lug structure of the instant invention lies in the fact that load applied to one of two adjoining panels may be partially transmitted to the other adjoining panel section. This is accomplished by using a configuration of the wedge-lug which permits the lug being bent back through the slot 11 in a shelf-bracket effect in order that it may be welded or otherwise secured to the web portion of the metal member 5 near the center. There is thus obtained the effect of a uniformly loaded beam rather than a cantilever loading effect and through the fastening to the web 7 the load is distributed over both adjoining panels.

For an understanding of the manner of erection and principles involved in the constant pressure joint of the instant invention, reference is now made to Figs. 1 through 6. The panel sections may be set and secured in place upon a plate or sill construction as used in conventional practice. It is to be understood that the term "constant" as used herein is not to be construed to mean that the pressure applied is a fixed quantity, but rather as being continuously applied and will always be exerted during use in a structure. The metal members 5, as installed, are under stress and are continuously tending to return to an unstressed condition. If there is any shrinkage in the material of the panels the member 5 will adjust itself because of the continuous tendency to return to an unstressed condition and thus apply sufficient pressure to keep the joint closed, and conversely, if the building material swells or expands, the member 5 will yield sufficiently to compensate for such change to keep the joint between the abutting panel sections closed.

In the steps illustrated in Figs. 1 through 6, a sill 20 is located on a flange portion 21 of a beam 22. Angles 23 and upper and lower base plates 24 and 25, respectively, are secured to the lowermost ends of the metal members 5 as by welding or other suitable methods to provide a means for attaching the panel sections to the plate or sill 20. A first panel section A, one end of which is provided with a metal member 5 having openings or slots 11, is firmly bolted to the plate or sill 20 by machine bolts as at 26. The nuts 27 are welded to the angles 23 prior to insertion of the metal members 5 between the sheets of building material 2. A second panel section B having wedge-lugs 14 in place with the inclined portions 17 and notch 18 protruding beyond the vertical edge of the panel section B, is then located adjacent the edge of the first panel section A as shown in Figs. 1 and 4 so that the second panel section B is about one-half inch higher than the previously erected first panel section A. The wedge-lugs 14 are engaged in the slots or openings 11 as shown in Figs. 2 and 5, and the second panel section B is then lowered and the action of the wedge-lugs draws the edges of sections A and B together. Sill bolt 26 is inserted through the registering apertures 28 and 28' and the second panel section B is drawn down tightly, during which operation the clamping action of the metal member 5 is developed. When the panel section B is drawn down by tightening the bolt 26, the facing edges carrying the spline and groove structure of the clamp strips 1 and the "claddings" 2 come in contact and begin to tighten before the gap 29 between the webs 7 of the metal members 5 closes as shown in Figs. 2 and 5. When the draw-down of panel section B by tightening sill bolt 26 is continued sufficiently to seat the panel section B on the sill 20 and completely close the gap 29, as shown in Figs. 3 and 6, a tensile stress is developed is developed across the flanges of the metal members 5 and 8 and 9. The curved portion 9 is forced to creep slightly, and in so doing produces a clamping action across the clamp strips 1 which develops a pressure at and along the joint line 30. The amount of pressure developed along the joint line 30 depends on the width of gap 29 and the gage of the metal member 5. Practical working pressures will range from 60 p. s. i. to 100 p. s. i., which is within the range of pressures that can be developed by metal members 5 fabricated of light gage metals up to 10 gage thickness. In view of the fact that the objective is to obtain just enough pressure to deform the wood fibers of the clamp strips 1, so that a tight, leakproof joint is obtained, the light gage metals are ideal for the purpose. With the novel structure of the instant invention, any shrinkage across the clamp strips 1 is always matched by clamping action of the metal member 5 attempting to return to a no-stress condition. On the other hand, if the clamp strips 1 swell on absorption of moisture, the metal members 5 are sufficiently flexible to accommodate the expansion.

While my novel structure has been described as utilizing wood clamp strips and metal clamping members, it is to be understood that combinations of other materials may be used in applying the principles of the present invention without departing from the scope of the present invention. Further, the panel sections may be formed of parallel sheets without benefit of intermediate supports other than the elements of the novel joint structure or they may be cellular in structure with provision for recessing the structural elements of the joint.

Having thus described my invention, what I claim as new and wish to secure by Letters Patent is:

1. A construction for demountable structural units assembled in adjacent edge-to-edge relation, comprising a plurality of pairs of parallel panel units, each unit including a pair of mutually spaced, registering panels, clamp-engaging strips attached to inner surfaces of said parallel panels, one strip adjacent each abutting panel edge, each of said strips having one surface thereof aligned with an abutting panel edge and an opposite non-planar surface facing inwardly of each said panel unit, means on said clamp-engaging strips for guiding abutting edges of said pairs of panels into registering position, flexible clamp means including a pair of non-planar portions joined by a planar web portion having apertures therein, said flexible clamp means being disposed in contacting engagement with the clamp-engaging strips along abutting edges of each unit, the non-planar portions of said flexible clamp means having a smaller radius of curvature than the non-planar portion of said clamp-engaging strips, interlocking means including a plurality of lugs carried by and extending outwardly through the apertures in the web portion of one of said flexible clamps at one abutting edge of each of said units, means for drawing said units down upon and securing them to a base structure, each of said lugs having a projection including a rearwardly inclined edge terminating in a notch for engaging the web portion of an adjacent unit through the apertures thereof, the rearwardly inclined edge of each of said projections coacting with an edge of each of said apertures in the web portion of an adjacent unit urging the web portions of flexible clamps on adjacent units into face contact and simultaneously urging facing surfaces of said flexible clamp means and said strips into continuous surface contact and seating said contacting web portions in said notches when said units are drawn down upon a base structure by said securing means thereby stressing said flexible clamp means to provide a constant pressure on said clamp strips to seal the joint at abutting edges of said units.

2. A construction providing constant closure for joints between abutting edges of a plurality of demountable structural units, each unit comprising a pair of parallel, mutually spaced, registering panels, clamp-engaging strips attached to inner surfaces of said parallel panels, one strip adjacent each abutting panel edge, each of said strips having a planar surface flush with each said abutting edge and a rounded surface opposite said planar surface, means on said clamp-engaging strips for guiding abutting edges of said pairs of panels into registering position, flexible clamp means including mutually spaced curved portions joined by a planar web portion having apertures therein, the curved portion of said flexible clamp means being in surface contact with said rounded surfaces of said strips when said units are assembled, the curved portions of said flexible clamp means being of smaller radius of curvature than said rounded surfaces of said clamp-engaging strips, interlocking means including a plurality of lugs carried by and extending outwardly through the apertures in the web portion of one of said flexible clamps at one abutting edge of each of said units, means for drawing said units down upon and securing them to a base structure, each of said lugs having a projection including a rearwardly inclined edge terminating in a notch, said rearwardly inclined edge of each of said projections coacting with an edge of each of the apertures in the web portion of an adjacent unit urging the web portions of flexible clamps on adjacent units into face contact and simultaneously urging facing surfaces of said flexible clamp means and said strips into continuous surface contact and seating said contacting web portions in said notches when said units are drawn down upon a base structure by said securing means thereby stressing said flexible clamp means to provide a constant pressure on said clamp strips to seal the joint at abutting edges of said units.

3. A construction for providing constant closure for joints between abutting edges of a plurality of demountable structural units, each unit comprising a pair of parallel, mutually spaced, registering panels, clamp-engaging strips attached to inner surfaces of said parallel panels, one strip adjacent each abutting panel edge, each of said strips having a plane surface thereof aligned with an abutting panel edge and a curved surface opposite said plane surface, means on the aligned surface of each of said strips for guiding abutting panel units into edgewise position, flexible clamp means including a pair of upstanding leg portions joined by a planar web portion having apertures arranged in predetermined patterns, said leg portions including a straight section terminating at the free end thereof in a curved portion, said flexible clamp means being in surface contact with said clamp-engaging strips in an assembled unit, the radius of curvature of the curved portion of said flexible clamp means being smaller than the radius of curvature of the curved surface of each said strip, interlocking means including a plurality of lugs carried by and extending outwardly through the apertures in the web portion of one of said flexible clamps at one abutting edge of each of said units, bolt means for drawing said units down upon and securing them to a base structure, each of said lugs having a projection including a rearwardly inclined edge terminating in a notch for engaging the web portion of an adjacent unit through the apertures thereof, said rearwardly inclined edge of each of said projections coacting with an edge of each of said apertures in the web portion of an adjacent unit urging the web portions of flexible clamps on adjacent units into face contact and simultaneously urging facing surfaces of said leg portions of said flexible clamp means and said strips into continuous surface contact and seating said contacting web portions in said notches when said units are drawn down upon a base structure by said securing means, thereby stressing said flexible clamp means to provide a constant pressure on said clamp strips to seal the joint at abutting edges of said units.

4. A structure as recited in claim 3 wherein said lugs are horizontally aligned in pairs and individually formed of resilient sheet material having non-parallel sided configuration in horizontal cross-section and secured to parallelly arranged strips in tandem relation, each lug of said pairs of horizontally aligned lugs being joined at the inner side thereof by a member forming a bight portion between each of said pair of lugs and at the outer sides thereof to said parallelly arranged strips, the lowermost edges of said individually formed lugs being rearwardly inclined for a portion of the length thereof, said rearwardly inclined portion terminating in a notched portion dimensioned to receive a plurality of web portions of said flexible clamps when arranged in contacting face relation.

5. A structure as recited in claim 3 wherein mating groove and spline members on facing plane surfaces of said strips constitute the guiding means.

References Cited in the file of this patent
UNITED STATES PATENTS

| | | |
|---|---|---|
| 1,625,612 | Jensen | Apr. 19, 1927 |
| 2,104,550 | Bates | Jan. 4, 1938 |
| 2,430,961 | Springer | Nov. 18, 1947 |